(12) United States Patent
Chavis et al.

(10) Patent No.: US 7,523,488 B2
(45) Date of Patent: Apr. 21, 2009

(54) METHOD FOR PERFORMING DATA ACCESS TRANSFORMATION WITH REQUEST AUTHORIZATION PROCESSING

(75) Inventors: Ira L Chavis, Wappingers Falls, NY (US); Frank J De Gilio, Poughkeepsie, NY (US); Margaret Radford, Cornwall-on-Hudson, NY (US); Paul J Wanish, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 679 days.

(21) Appl. No.: 10/966,215

(22) Filed: Oct. 15, 2004

(65) Prior Publication Data
US 2006/0085841 A1 Apr. 20, 2006

(51) Int. Cl.
*H04L 9/32* (2006.01)
(52) U.S. Cl. ............................... 726/4; 726/27; 726/28; 726/29; 726/30; 707/9
(58) Field of Classification Search ................. 726/3–7, 726/16–21, 27–30; 713/200, 201
See application file for complete search history.

(56) References Cited

U.S. PATENT DOCUMENTS

| | | | |
|---|---|---|---|
| 5,727,145 A | 3/1998 | Nessett et al. | 395/186 |
| 5,826,029 A | 10/1998 | Gore, Jr. et al. | 395/200.57 |
| 6,148,402 A | 11/2000 | Campbell | 713/200 |
| 6,381,644 B2 | 4/2002 | Munguia et al. | 709/225 |
| 7,231,661 B1* | 6/2007 | Villavicencio et al. | 726/4 |
| 7,260,720 B2* | 8/2007 | Yamamoto et al. | 713/169 |

(Continued)

OTHER PUBLICATIONS

*Computer and Network Security Fundamentals*, "Chapter 1.4.3: Static Versus Dynamic Models," (pp. 9-10) & "Chapter 1.6: Authentication," (pp. 15-16), Sun MicroSystems, Inc., Jun. 1999 (ISBN: 0-201-31000-7).

(Continued)

*Primary Examiner*—Kambiz Zand
*Assistant Examiner*—Amare Tabor
(74) *Attorney, Agent, or Firm*—Lily Neff, Esq.; Kevin P. Radigan, Esq.; Heslin Rothenberg Farley & Mesiti, P.C.

(57) ABSTRACT

A computing environment security agent is provided for automatically determining whether to grant access to an asset, deny access to the asset, or grant access to a transformed asset responsive to an asset request by a user of the computing environment. The security agent includes logic for authenticating a user for computing environment access, for receiving a request from the authenticated user to access an asset, and for determining whether the authenticated user is authorized to access the asset, and if so, for determining whether to transform the asset responsive to the request to access the asset by the authenticated user. The security agent can further include logic for transparently transforming the requested asset or for defining at least one transformation rule for the requested asset and saving the at least one transformation rule in a transformation list accessible by the authenticated user.

8 Claims, 8 Drawing Sheets

U.S. PATENT DOCUMENTS

| | | | |
|---|---|---|---|
| 7,263,717 B1 * | 8/2007 | Boydstun et al. | 726/4 |
| 7,278,168 B1 * | 10/2007 | Chaudhury et al. | 726/30 |
| 2002/0129274 A1 | 9/2002 | Baskey et al. | 713/201 |
| 2003/0149778 A1 | 8/2003 | Robinson et al. | 709/229 |
| 2004/0006710 A1 * | 1/2004 | Pollutro et al. | 713/201 |
| 2004/0019808 A1 * | 1/2004 | Devine et al. | 713/201 |
| 2004/0117619 A1 * | 6/2004 | Singer et al. | 713/156 |

OTHER PUBLICATIONS

Wylder, J., *Strategic Information Security*, "Chapter 9: Authentication Models and Strategies," Auerbach Publications, 2004, (3 pgs.) (ISBN: 0-804-932041-0).

* cited by examiner

METHOD FOR PERFORMING DATA ACCESS TRANSFORMATION WITH REQUEST AUTHORIZATION PROCESSING

TECHNICAL FIELD

This invention relates, in general, to asset access within a computing environment, and more particularly, to security processing for automatically determining whether to grant access to an asset, deny access to the asset or grant access to a transformation of the asset responsive to an asset access request by an authenticated user of a computing environment.

BACKGROUND OF THE INVENTION

In a computing environment, such as a network environment, users identify themselves to a security agent of the computing system using a number of different techniques including, but not limited to, user ids, passwords, and digital certificates. This identifying information is then employed during authentication and authorization processing of the user to determine whether to grant or deny access to a system asset, such as a system resource or data object. This determination is a binary action based on the credentials presented. That is, access to computer system assets is conventionally prohibited when the requesting user is not authorized to access the asset. For example, an NFS server and an HTTP server each typically provide binary access control of data, i.e., deterministic access. In certain computing environments, this deterministic approach unnecessarily restricts work and information flow.

Therefore, enhanced data access authorization processing providing an indeterministic response to a request for authorization made by an authenticated user in a computing environment is believed advantageous.

SUMMARY OF THE INVENTION

The shortcomings of the prior art are overcome and additional advantages are provided through the provision of a method of providing access to an asset via a computing environment security agent. The method includes: authenticating a user for computing environment access; receiving a request from the authenticated user to access an asset; and determining whether the authenticated user is authorized to access the asset, and if so, automatically determining whether to transform the asset responsive to the request to access the asset by the authenticated user.

In certain enhanced aspects, the present invention includes automatically defining a transformation rule for the requested asset when the determining determines that the transformation is to occur, and allowing authenticated user access to a transformed asset. The transformed asset is identified by the transformation rule and access thereto is automatically allowed responsive to the request by the authenticated user for access to the asset. Further, the transforming of the requested asset can be transparent to the authenticated user. In an alternate embodiment, the method further includes automatically defining at least one transformation rule for the requested asset when the determining determines that transformation is to occur, saving the at least one transformation rule in a transformation list, and allowing the authenticated user to access the transformation list to select a transformation rule therefrom. The allowing of access to the transformation list can be responsive to a request therefore received from the authenticated user. Thereafter, the processing allows the authenticated user access to a transformed asset defined by the user selected transformation rule from the transformation list.

Systems and computer program products corresponding to the above-summarized methods are also described and claimed herein.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
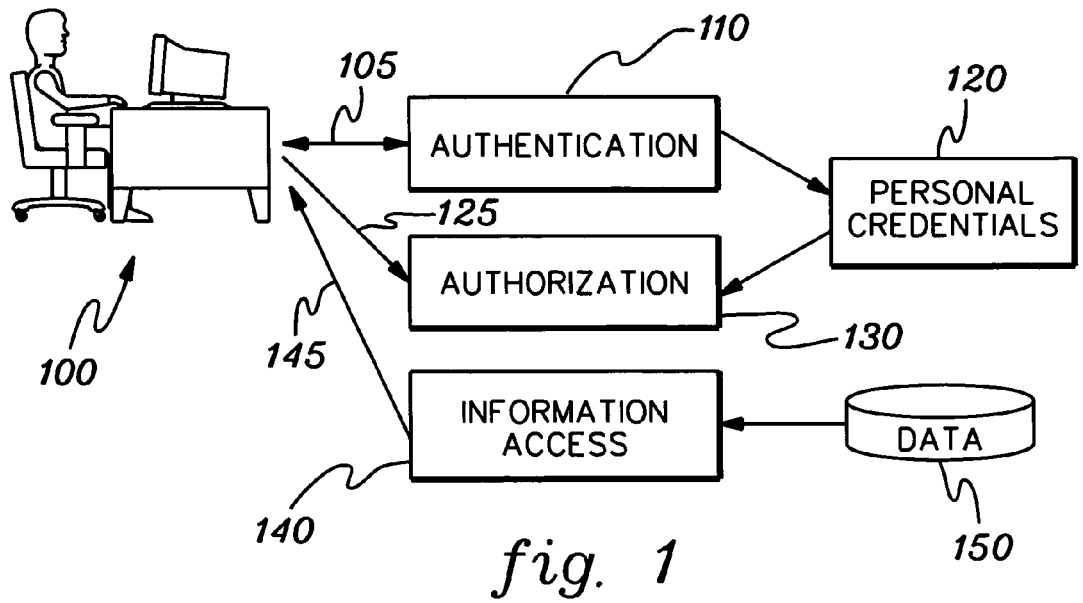
FIG. 1 depicts one example of a computing environment security agent utilizing conventional authentication and authorization processing for allowing a user access to a data asset.

Generally stated, provided herein are various extensions to existing security services or control agents. More particularly, disclosed herein is the use of credentials presented during authentication to authorize and potentially transform access to a requested asset of a computing environment. Conventionally, a request to access an asset results in either allowance or denial of the resource access. In accordance with an aspect of the present invention, through data transformation based on resource authorization, an authenticated user is able to obtain a view of data that is appropriate for that user's approved access.

One skilled in the art will recognize the long standing control process within a computing system of preventing access to system resources when the user is unauthorized. The conventional set of system controls includes three categories:
1. Authentication—the validation of a person or process through non-repudiation of presented credentials;
2. Authorization—based on successful authentication, user access is permitted to a resource; and
3. Access—the action of the authenticated user in acquiring the asset.

The relationship of the authorization and access categories is changed by the concepts presented herein. Note that the examples provided below are discussed with reference to accessing "data" or "data objects" within a computing environment. However, the concepts apply generally to any computing asset, including data, resources, system services, etc. Note also, that the "user" discussed herein refers to any entity, including a person or a process, and may include an automated application attempting to access a computing environment asset. Additionally, note that the processing described herein is implemented, in one embodiment, in a computing environment security agent. This security agent is the security model or process through which authentication and authorization protocol is implemented and may be, in one embodiment, a system-wide or enterprise level agent.

In one aspect of the indeterministic processing disclosed herein, requested data can be transformed by the security agent at the time of the data access. Thus, it is possible to have two different authenticated users receiving different information, notwithstanding that both users request the same asset. This can occur, for example, by an implicit change or transformation in the requested asset at the time of authorization of one or both of the requests. A computing system security agent maintains the credentials of the authenticated user, and the system services may provide different data based on the requesting user. In another aspect, the authorization and transformation processing can be employed to deduce or create an alternative list of transformed assets or transformation rules. In this case, the computing system might indicate to the user a failure to access a requested asset, but not create an error log resulting therefrom. The computing system then allows the user to make a second service request to decide if the user was truly rejected, or can select a substitute or transformed asset based on a transformation rule. This enables applications that might choose one of many forms of assets to make an intelligent substitute decision. Advantageously, the concepts described herein can be combined in a single computing environment, and can extend an existing computing system without application implications for continued use, with consistent protection with today's environment, and with extensions that could be exploited by new applications.

The concepts disclosed herein presuppose that the user has already successfully been authenticated using existing techniques. After authentication is complete, the computing system retains the credentials for the user. Then, when an asset is requested by the user, either directly or indirectly in the form of the token for access, the basic authorization servicing can be extended as disclosed herein. Before discussing the extensions, aspects of existing security agent processing are described below with reference to FIGS. 1-4.

When a first access to an asset occurs, authorization is typically a prerequisite. This could be when, for example, a data file is opened, the File Transfer Protocol (FTP) requests a file, or when a relational database connection is established. Conventionally, authorization processing is deterministic, either rejecting or enabling access to the asset, after which the asset is transferred.

More particularly, a symbolic link can currently allow variables to be used that would allow the link to manage locating different files from a single symbolic link by allowing the operating system to fill in the contents of the variables when the link is traversed. In this manner, multiple files can be referenced by a single link. A security label could be referenced as a methodology for ensuring that different files could be accessed based on the user's identity. This requires that the files be known to a single operating system and that new security information, as well as the files reside on the same operating system (or at least the references to a file are on the same operating system). The application always gets a deterministic result. The operating system retains the responsibility for determining the appropriate file for every user. This would not work in a grid environment where files are spread out among multiple operating systems and platforms.

FIG. 1 depicts one example of a computing environment security agent, utilizing conventional authentication and authorization processing for allowing access to data 150 by a user 100. As shown, user 100 passes identifying information such as a user id and password 105 to the computing system which undertakes an authentication process 110 and preferably stores the user's personal credentials 120 for future reference. The computing environment then receives a request for access to an asset 125 and undertakes authorization for the user 130 with reference to the user's personal credentials 120. Assuming that authorization is accepted, then information access 140 to data 150 is granted 145. Again, this is a deterministic approach which either grants or rejects via the authorization processing the user's request for access to a particular asset. Further, there is typically appropriate logging for subsequent intrusion detection analysis should an access request fail.

Figure 2:
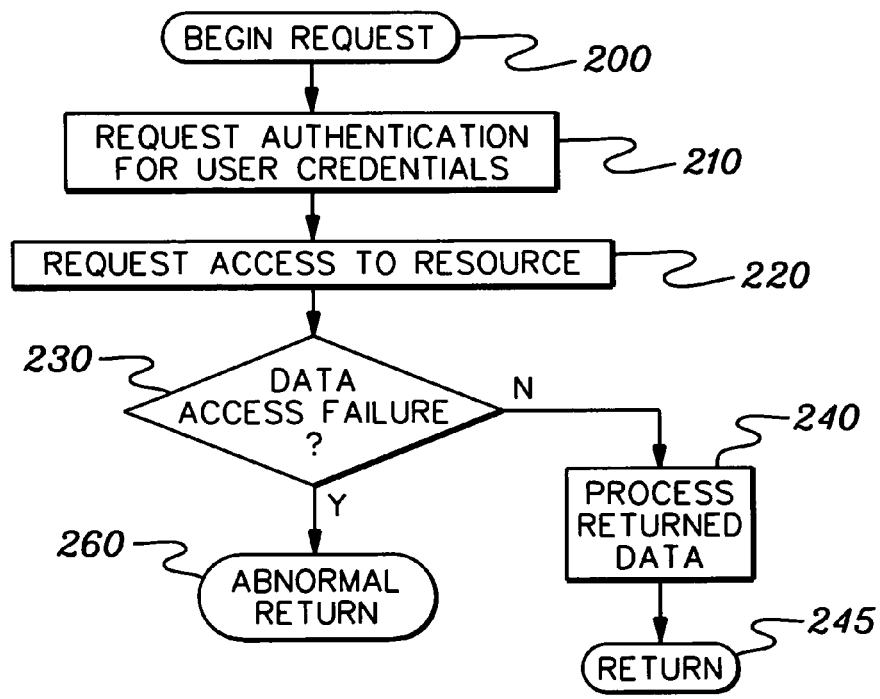
FIG. 2 is a flowchart of one embodiment of user processing during deterministic accessing of a data asset within a computing environment, as well as for indeterministic accessing of an asset with implicit data asset transformation, in accordance with an aspect of the present invention.

FIG. 2 is a flowchart of one embodiment of user processing for the deterministic accessing of a data asset within a computing environment. This figure also depicts user processing during an indeterministic accessing of an asset with implicit data asset transformation, in accordance with an aspect of the present invention, and as described further below in connection with FIGS. 5 & 6. Processing begins 200 in FIG. 2 with the user (i.e., human or automated application) becoming known to the system via an authentication process 210 wherein user credentials, such as user id and password, are transferred and validated by the computing system. The computing system then retains this user information for later use (see FIG. 3). If the user is properly identified, then a request by the authenticated user may subsequently be made to the computing system for the acquisition of an asset, such as a data asset or other resource 220. Processing determines whether to grant the data access 230, and if so, then the user receives and processes the returned data asset 240 before returning 245 to the point of call. If the data access request fails, then an abnormal access or rejected access indication is returned 260 to the user.

Figure 3:
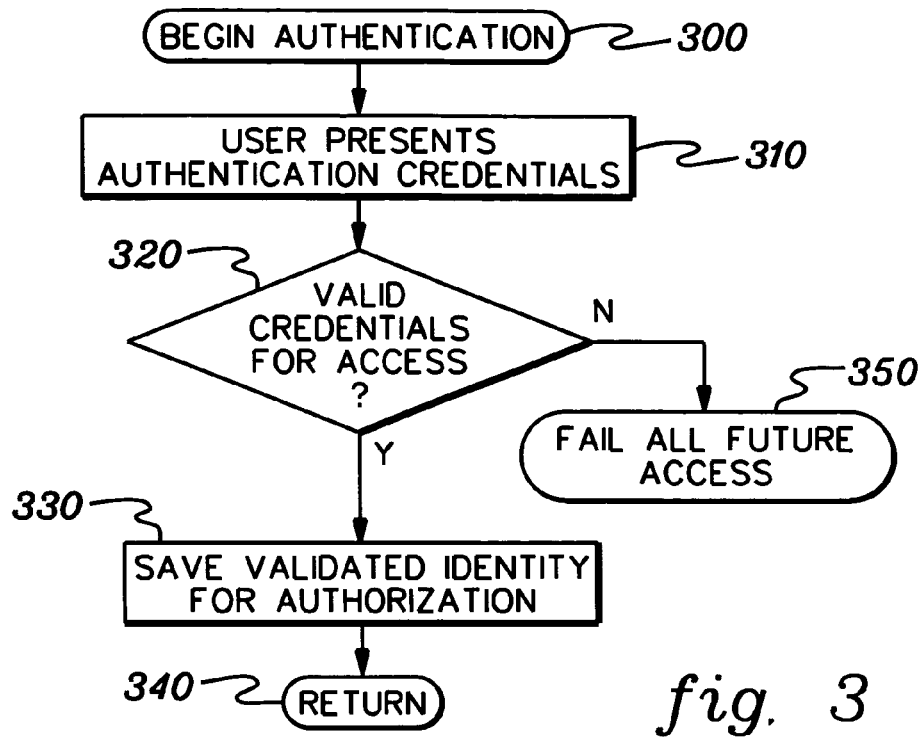
FIG. 3 is a flowchart of one embodiment of conventional authentication processing by a computing environment responsive to a user authentication request.

FIG. 3 depicts a flowchart of one embodiment of conventional authentication processing by a computing environment security agent responsive to a user's authentication request. This authentication process begins 300 with the user presenting authentication credentials 310. The credentials are evaluated and a determination is made whether the user has presented valid credentials for computing system access 320. As noted above, one skilled in the art might use any one of various known techniques for authenticating a user, including, for example, password files and advanced techniques of digital signatures or biometrics. If the user is not authenticated, then access is rejected, and typically the connection is terminated 350. If, on the other hand, authentication is validated, then credentials related to the authentication process and access are retained 330 before returning 340 processing control.

Figure 4:
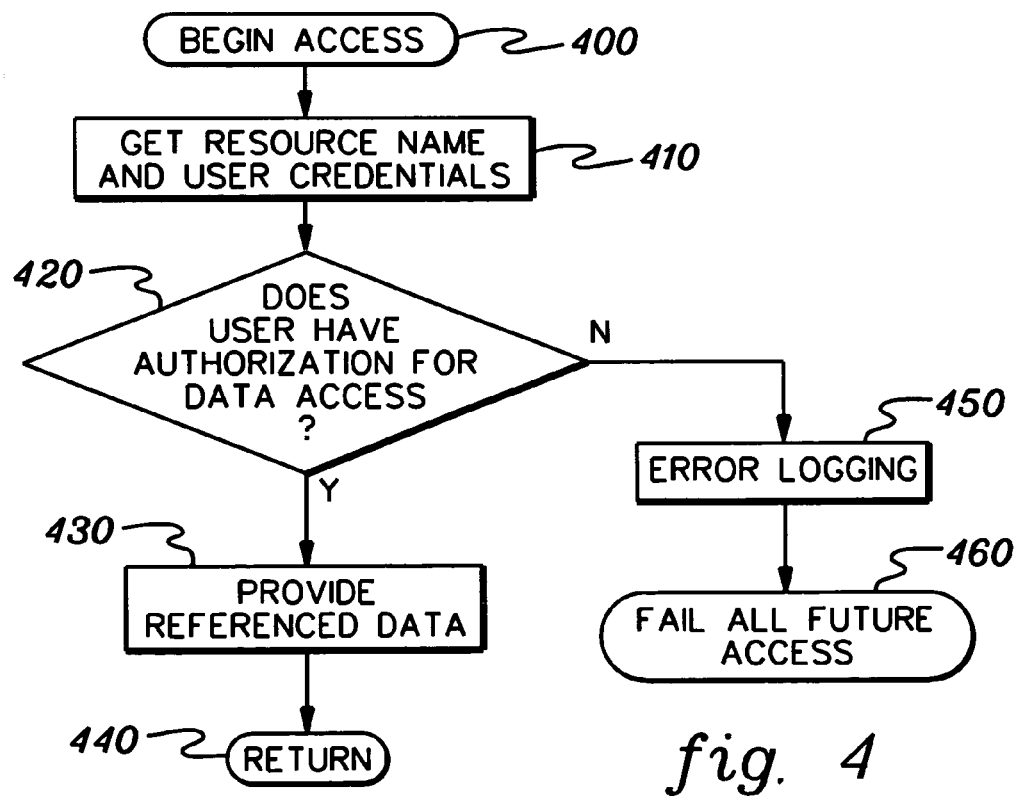
FIG. 4 is a flowchart of one embodiment of conventional authorization processing by a computing environment for authorizing and allowing access to a data asset responsive to a user request.

FIG. 4 depicts a flowchart of one embodiment of conventional authorization processing by a computing environment security model for authorizing and allowing access to a data asset responsive to a user request. This processing begins 400 with the computing system requiring the name of the asset requested, along with the user's credentials 410. If the user is not authorized to access the data asset 420, then the request is failed with error logging 450 and access is terminated 460. If the asset access is permitted, then the asset is returned or made available to the user 430 and control is successfully returned 440.

In one aspect, the present invention is based on the notion than an enterprise will embrace a network security implementation. This is advantageous for data grid implementations. In a data grid, it is too inefficient to continuously convert identities and rely on the platform security. It is more efficient to deal with the identity and its authorization using a non-platform context. Rather than relying on platform based security, the present invention allows a non-platform security model to secure objects in a non-deterministic manner. Unlike traditional platform based security models, the security model presented herein can return to the caller an answer that defines a response that is not binary. Additionally, if the response is not deterministic, there would be no "false positive" report in the security log. Since a non-deterministic answer would result in further searching for a deterministic result, the application itself is responsible for generating variant names of the requested source. Since subsequent calls can go to different servers for each variant, the operating systems are not involved in the security process. The fact that the application (or middleware) plays a role in the determination of variants allows the security model to be controlled at a different level than the operating system model.

Provided herein in one aspect is system security processing that enables a transformation of a requested asset that is being protected at the time that the asset is presented to the user requesting the asset. The form of transformation can be established at the time of authentication. This transformation can be either through direct mapping of information (as in a replacement file for an original file that is requested) or through an algorithmic transformation (as in the extraction of a name or other data from a requested asset). With the processing disclosed herein, if access to the basic information is not permitted because of the authorization check, an implicit transformation of the requested asset may be performed and this transformed asset may be returned to the user (see FIGS. 5, 2 & 6). Various approaches to transforming a requested asset may be employed in this regard. A simple technique would be to replace a file (for FTP) or to select a different column when returning data from a relational table. Alternatively, instead of implicitly transforming the requested asset, the user requesting the asset can be rejected from asset access and the computing system security agent can provide a service that could assist the user in mapping the request to information that could be successfully accessed, for example, through a list of transformation rules for which the user is authorized (see FIGS. 7-10).

Figure 5:
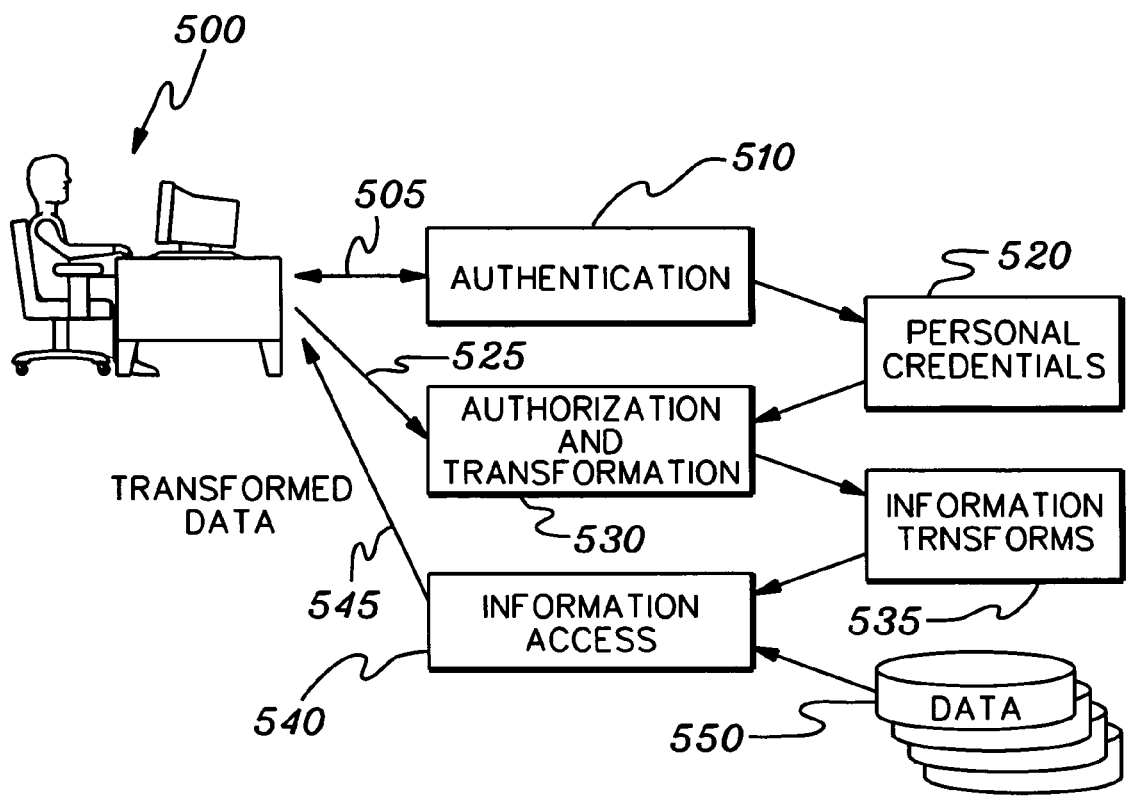
FIG. 5 depicts one example of a computing environment security agent employing authorization and asset access transformation processing, in accordance with an aspect of the present invention.

FIG. 5 depicts one example of a computing environment security agent employing authorization and asset access transformation processing in accordance with an aspect of the present invention. A user 500 again requests authentication 510 by providing appropriate identifying information such as a user id and password 505. Upon authentication, the user's personal credentials are saved 520 for future reference during an authorization and transformation process 530. After authentication, the user requests access to an asset 525, and once the asset is identified, the user will either be denied access, receive the asset as recorded, or receive an alternate expression of the asset (i.e., a transformation thereof). In this case, the transformation is assumed to be implicit and transparent to the user. Various information transforms 535 can be defined within the computing environment security system for use during the transformation process. Information access 540 uses these transforms to, for example, transparently provide a transformed data asset 545 from the saved data 550. As a simple example, the transformation could be the redirection of a File Transfer Protocol (FTP) data transfer. In engineering designs, transformation could be either the detailed componentry of an engineering component, or an abstract expression of the space, represented only as its notation of features such as space, power, heat, mass and angular momentum. The choice of representation would be based on the user's authorization. By way of further example, implicit content transformation can be performed during the authorization process. More particularly, during authorization the transformation process can be defined and applied for any subsequent access to the requested asset. As an example, for medical studies a lab technician might see the patient's name, but an analyst would only see the name as an abstract value (e.g., a number). Further, if the user does not see the actual requested asset, an access error log report may or may not be generated, e.g., based on the security constraints defined for that user.

Figure 6:
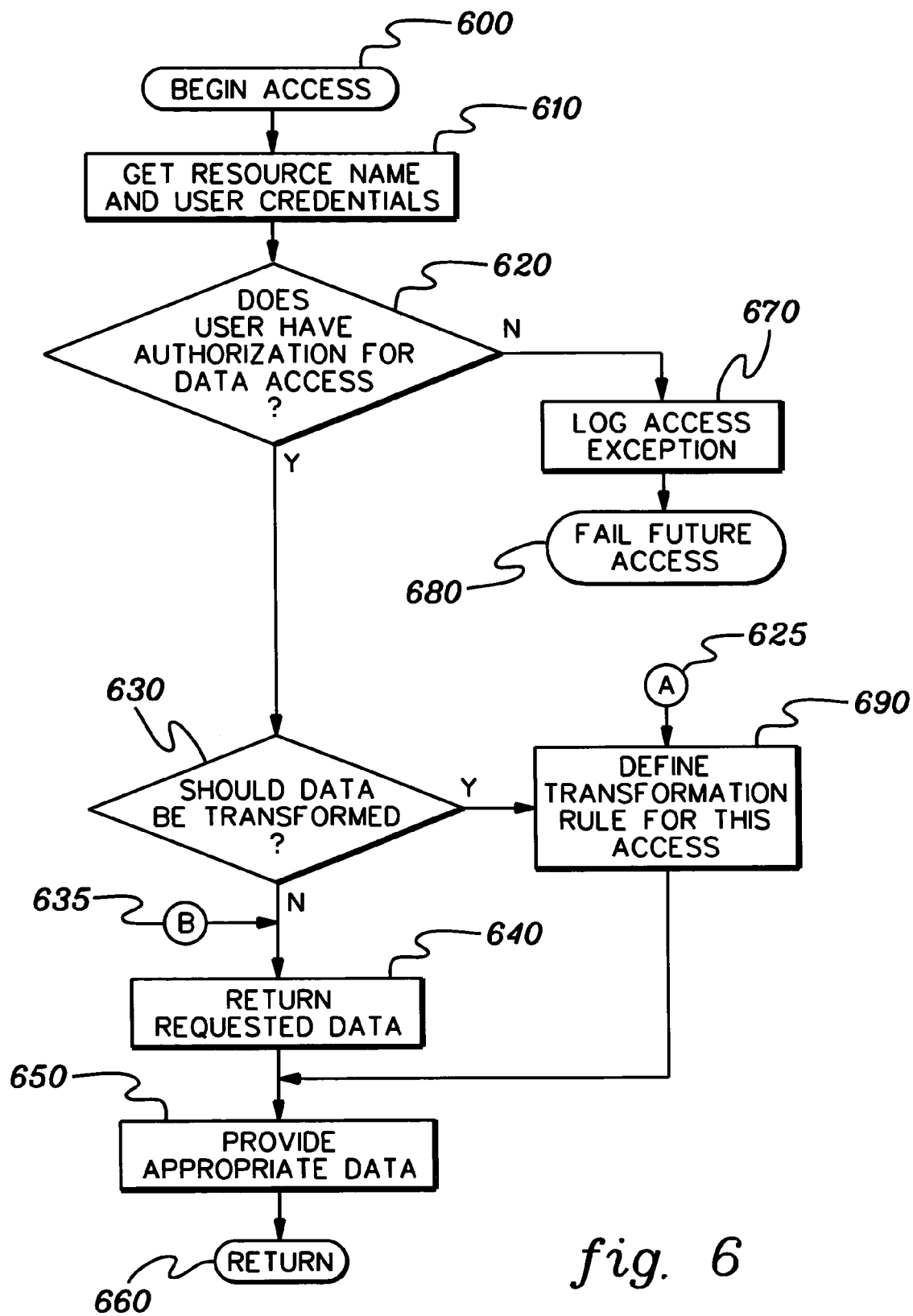
FIG. 6 is a flowchart of one embodiment of authorization and transparent transformation processing provided by a computing environment security agent, in accordance with an aspect of the present invention.

FIG. 6 depicts one example of authorization and transparent transform processing within a computing environment security model in accordance with an aspect of the present invention. Processing begins 600 with the system again requiring the name of the asset requested by the user as well as the user's credentials 610. Processing then determines whether the user has authorization for accessing the requested asset 620. If no, then an access request failure is logged 670 and access is terminated 680.

If the user does have authorization for the requested asset, then processing determines whether a transformation of the asset should be implemented 630. If the asset can be returned without transformation 640, for example, because of the user's authorization, then the requested asset is provided 650 before processing returns 660. If the requested asset is not authorized, but an alternative is enabled, then a transformation rule for the requested asset is defined 690 and the transformed asset is provided as the appropriate data 650 to the user transparent and responsive to the user's request for the original asset. Note that entry points 'A' 625 and 'B' 635 are common entry points into the process of FIG. 6 from the logic flow of FIG. 9.

Figure 7:
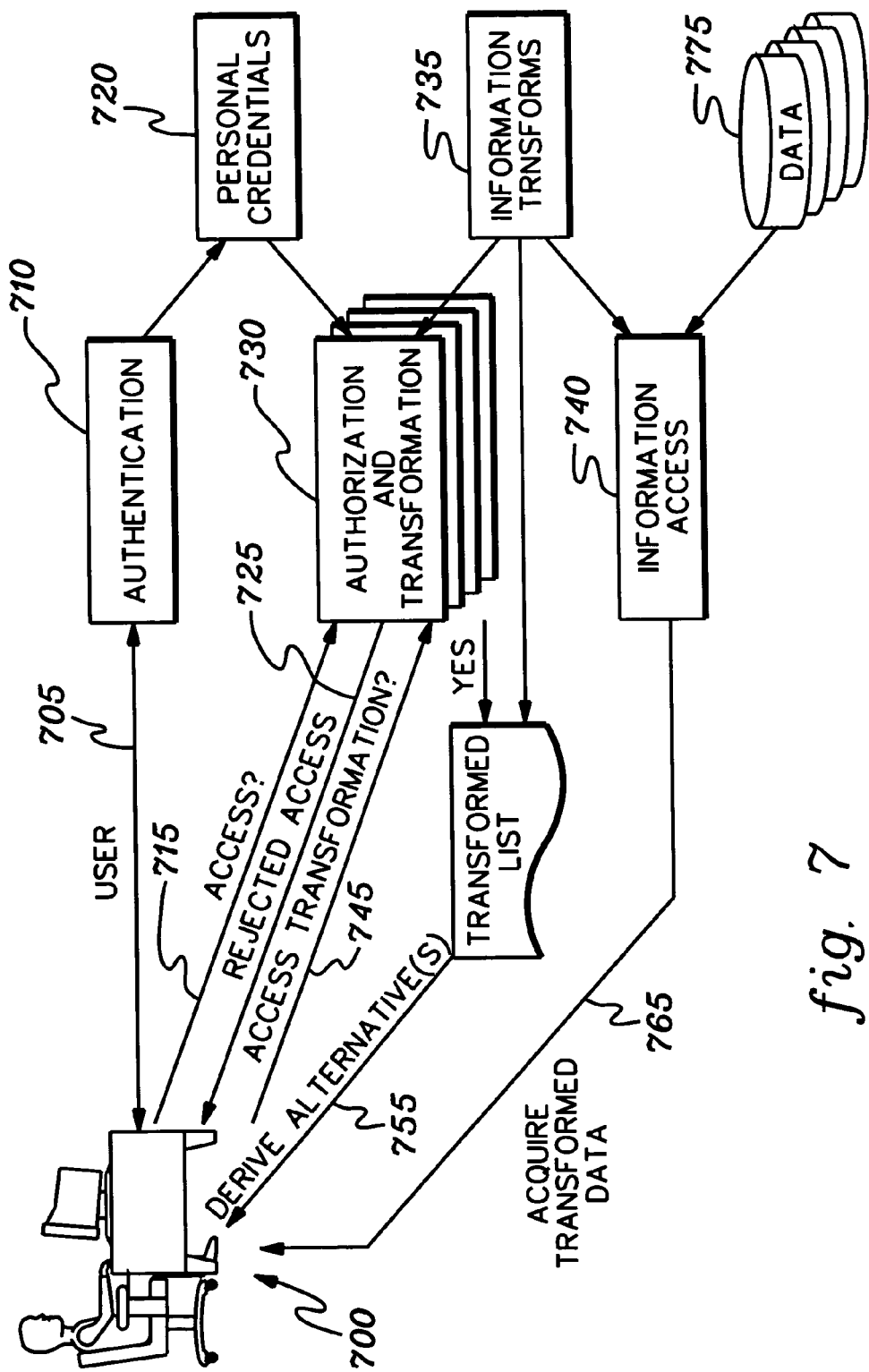
FIG. 7 depicts one embodiment of a computing environment security agent employing authorization and explicit asset access transformation processing, in accordance with an aspect of the present invention.

FIG. 7 depicts one embodiment of a computing environment security agent employing authorization and explicit asset access transformation processing, in accordance with an aspect of the present invention. In this approach, a user can adapt to authorization failure, which is contrasted with conventional art that would require the application builder to present error messages to the user when authorization is denied and access prevented. In accordance with the present invention, processing detects that the actual requested asset access is prevented, while alternate versions of the asset are permissible for the requesting user.

As shown in FIG. 7, a user 700 again provides credentials 705 for an authentication process 710, which once accepted, are saved 720 for future reference during an authorization and transformation process 730. Authorization processing is responsive to an asset access request 715 from the user. When denied, an access rejection 725 is returned to the user 700. The user 700 then inquires whether a transformation list is available for the asset requested 745. The security processing detects that other forms of the asset are available and requires rules for reasonable approaches to transforming, for example, the requested asset 735. The security processing interacts with this set of transformation rules 735 to determine the most appropriate alternate rule for the data, or a list of alternate rules, and provides a transformed list 755 back to user 700. The authorization for a newly selected asset is then attempted, and presumably granted via information access processing 740 so that the user 700 receives in return a transformed data asset 765 in comparison to the originally requested data 775.

Figure 8:
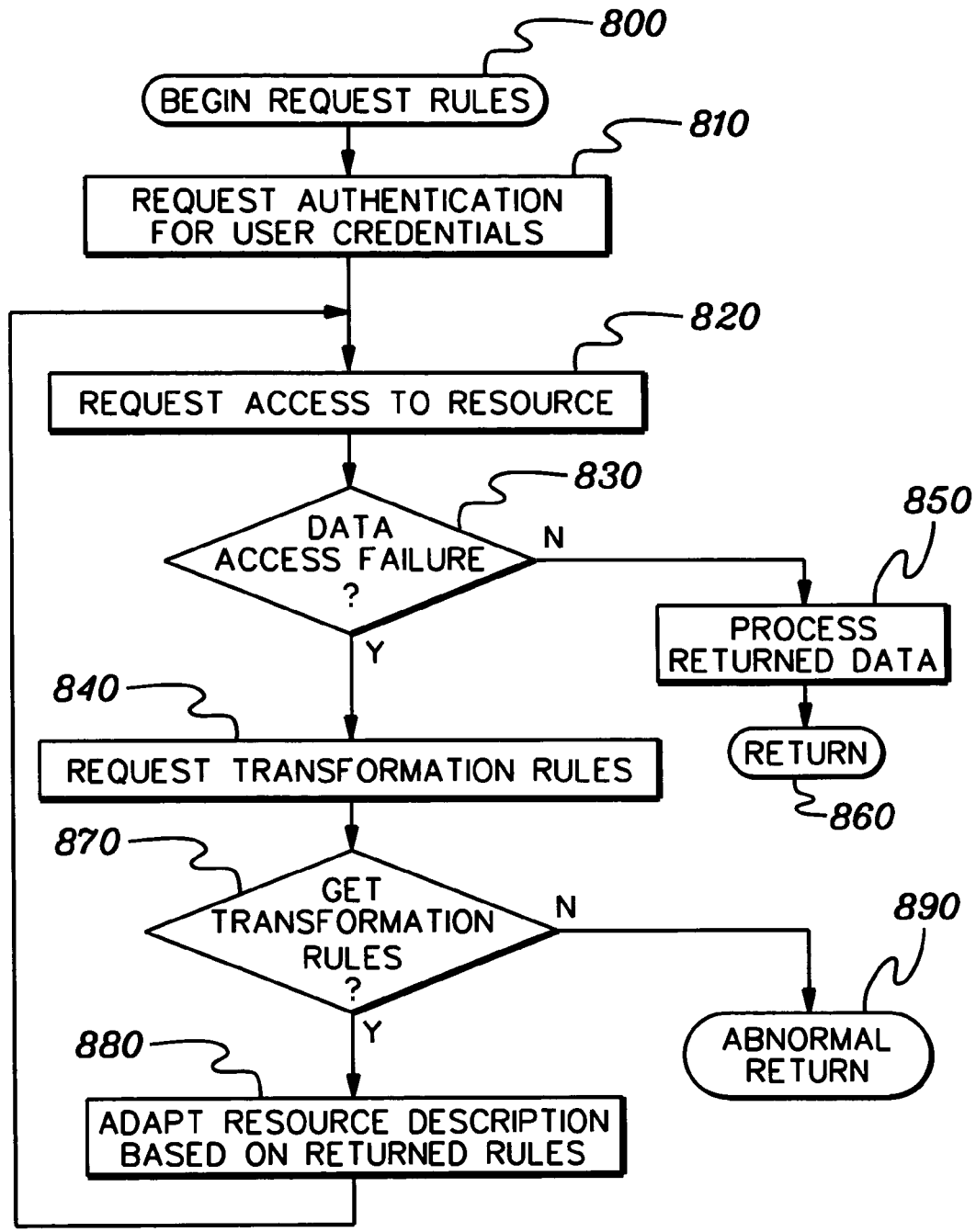
FIG. 8 is a flowchart of one embodiment of user processing during explicit asset access transformation processing, in accordance with an aspect of the present invention.

FIG. 8 is a flowchart of one embodiment of user side processing during the explicit asset access transformation process depicted in FIG. 7. As shown, this processing begins 800 with the user requesting authentication 810, and once accepted, the user requests access to a resource or other computing environment asset 820. After requesting access, user processing determines whether the data access request has failed. If no, then the user processes the returned data or asset 850 before conventionally returning 860. If data access has failed 830, then the user may request transformation rules 840 to determine whether an alternative asset is available. If no information is returned, then the user assumes that the request was truly not permitted 890. If the computing system returns a transformation object or list, then the user uses the returned rules to adapt the requested asset description 880, and the process is repeated for the transformed asset request. It is assumed that the user will not inherent any additional security privilege with the transformation rules, or any subsequent request.

Figure 9:
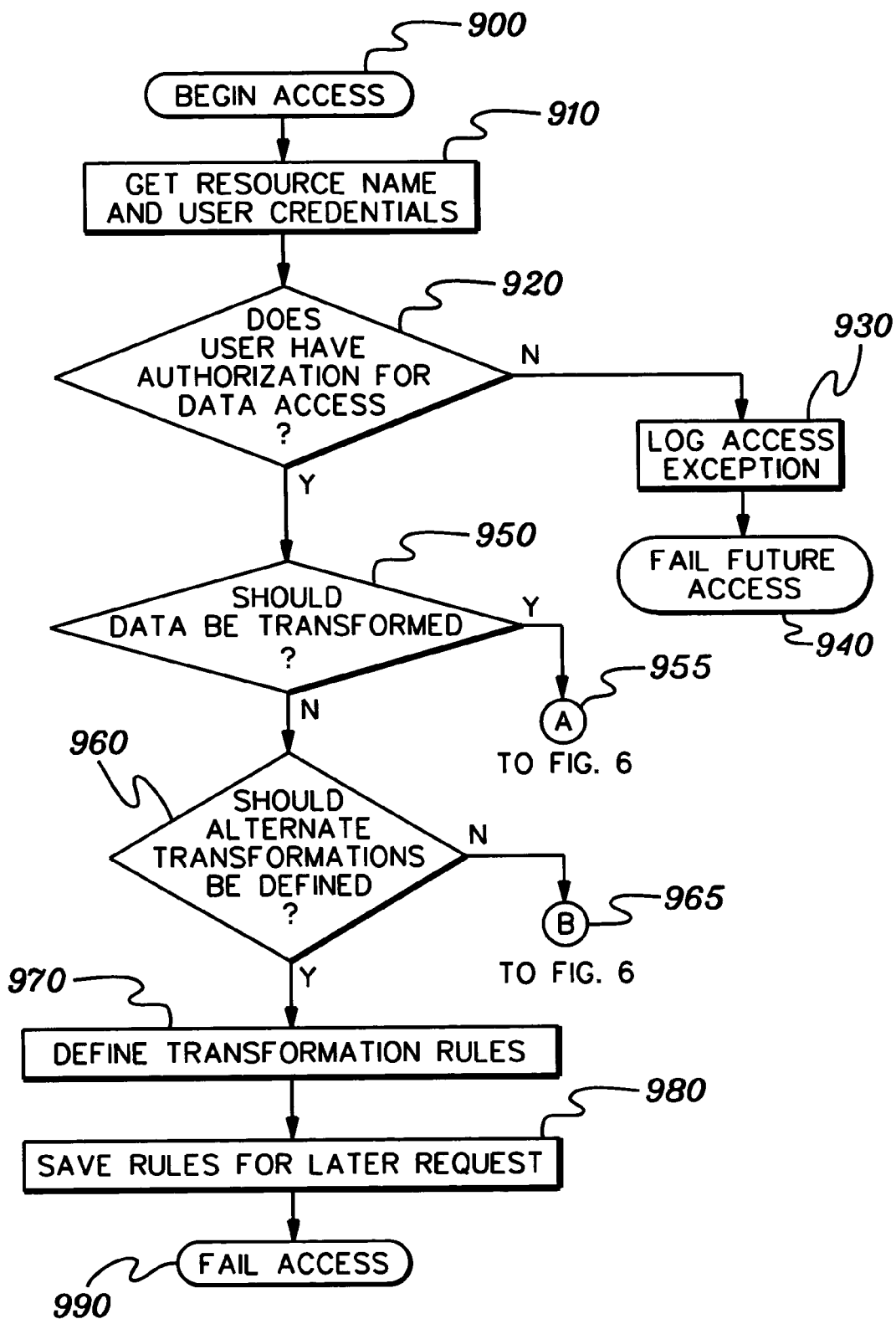
FIG. 9 is a flowchart of one embodiment of authentication and explicit asset access transformation processing provided by a computing environment security agent, in accordance with an aspect of the present invention.

FIG. 9 depicts a flowchart of one embodiment of authentication and explicit asset access transformation processing within a computing environment security agent, in accordance with an aspect of the present invention. This processing is an extension of the processing depicted in FIG. 4. The logic begins 900 with the security system obtaining the name of a requested asset and the user's credentials 910, which are then used to determine whether the user has authorization for accessing the requested asset 920. If no, then the asset request is logged 930 and the connection terminated to fail future accesses 940.

Assuming that the user does have authorization for accessing the requested asset, processing determines whether the asset should be transformed 950. For example, transformation of the requested asset may automatically occur based on authorization level of the user if there is only one asset transformation appropriate. If so, then processing continues 955 with the processing flow of FIG. 6 at entry point 'A' 625 to define the transformation rule for the requested asset 690 and then provide the appropriately transformed asset 650 to the user.

If there is other than just one transformation that should be performed, then processing determines whether there are alternate transformations to be defined 960. If no, then processing returns 965 to FIG. 6 at entry point 'B' 635 and allows return of the user requested data asset 640. Otherwise, multiple transformation rules are defined 970 and saved for subsequent request by the user 980. The requested asset access is then failed 990. Again, the alternate transformation rules may be returned to the user upon the user's request, as the transformation list, which the user then interactively employs to select an alternate asset for request authorization.

Figure 10:
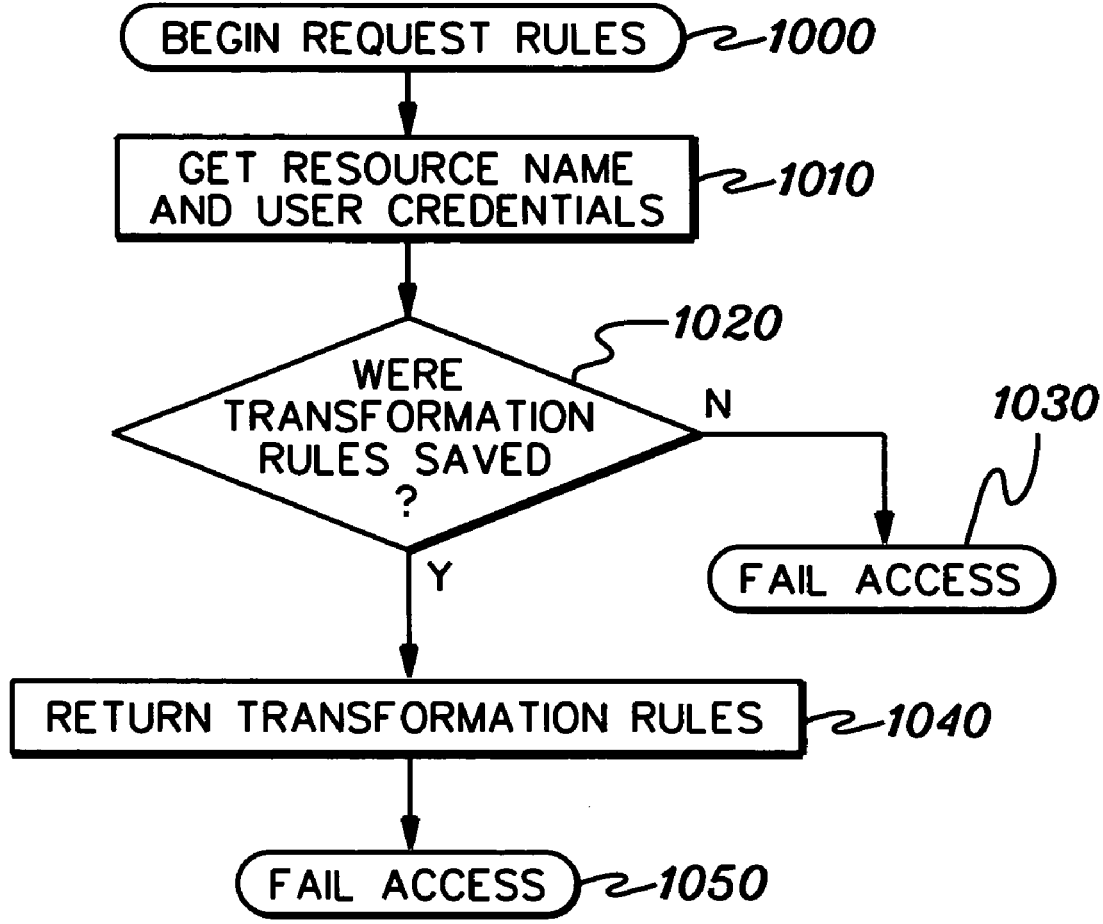
FIG. 10 is a flowchart of one embodiment of processing provided by a computing environment security agent for user access to a list of transformation rules, in accordance with an aspect of the present invention.

FIG. 10 is a flowchart of one embodiment of security processing for user access to a transformation list. This processing begins 1000 when the user and the requested resource are again identified 1010 and processing checks whether transformation rules were saved 1020 based on a prior request for asset. If there are no rules available, then control is returned immediately and the access is failed 1030. This is assumed not to create an error log, since the security application, if not authorized, had already created the log in prior processing flows. Assuming that transformation rules were saved, the rules are returned 1040 to the user and access to the originally requested asset is failed.

By way of specific example, the concepts presented herein can be employed to map user credentials to a policy within a data server, and requests from a system service (e.g., controlling security) to the authorization of the user. Traditional NFS access would return "read" or "fail request". To this deterministic response, the present invention adds the option of a transformation. In a one case, a file access resource name can be altered in a predefined way (e.g., "a.gif" can become "_a.gif"), and the process is repeated. More complicated implementations would provide an exit for the data owner to compose the replacement data source name. The data provider could be responsible for creating two instances for the two variations on the policies. As a real example of the problem, when building a fighter jet, all people/companies might view the outer shell, and locate where the guidance computer should be, but would not be cleared to view the details of the computer, and would be responsible for the guidance computer's internal power transformer. The invention enables this type of drill-down, without compromising security concerns with unauthorized access to details. In one implementation, com.tovoli.mts.PDPermssion.implies( ) would alter the mame to a resource that would be acceptable for access for the user. Alternatively, the "indeterminate" response can be given to a caller, who then tries a different mame using a transformation list.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of providing access to a secured asset via a computing environment security agent, the method comprising:
   authenticating a user for computing environment access;
   receiving a request from the authenticated user to access a secured asset; and
   responsive to the request to access the secured asset, determining whether the authenticated user is authorized to access the secured asset, and if so, after authorizing the authenticated user to access the secured asset, determining by the computing environment security agent whether to transform the secured asset responsive to authorization of the authenticated user to access the secured asset, and if so, after determining by the computing environment security agent that the secured asset should be transformed, non-deterministically transforming data content of the secured asset by the computing environment security agent based on the authenticated user's authorization to access the secured asset, the non-deterministic transforming of secured asset data content occurring prior to allowing the authorized user access to the transformed data content of the secured asset.

2. The method of claim 1, further comprising automatically defining a transformation rule for the requested secured asset when the determining determines that transformation of the data content of the secured asset is to occur.

3. The method of claim 2, further comprising allowing authenticated user access to the transformed asset, the transformed asset being identified by the transformation rule and access thereto being automatically allowed responsive to the request by the authenticated user for access to the secured asset and authorization of the authenticated user to access the secured asset.

4. The method of claim 2, wherein transforming data content of the requested secured asset by the computing environment security agent occurs automatically and is transparent to the authenticated, authorized user.

5. The method of claim 1, further comprising automatically defining by the computing environment security agent at least one transformation rule for the requested secured asset when the determining determines after authorization of the authenticated user that transformation is to occur, saving the at least one transform rule in a transformation list, and allowing the authenticated user to access the transformation list to select a transformation rule therefrom.

6. The method of claim 5, wherein the allowing access to the transformation list is responsive to a request therefor received from the authenticated user, the request for the transformation list being received subsequent to sending an access rejection from the computing environment security agent to the authenticated user responsive to the authenticated user's request to access the secured asset.

7. The method of claim 6, further comprising allowing the authenticated user access to transformed data content of the secured asset, the transformed data content being defined by the user selected transformation rule from the transformation list.

8. The method of claim 1, further comprising allowing the authenticated user access to the requested secured asset when authorized and when no transformation of the asset is to occur.

* * * * *